F. M. BUCKMASTER.
Horse Rake.
No. 95,315. Patented Sept. 28, 1869.
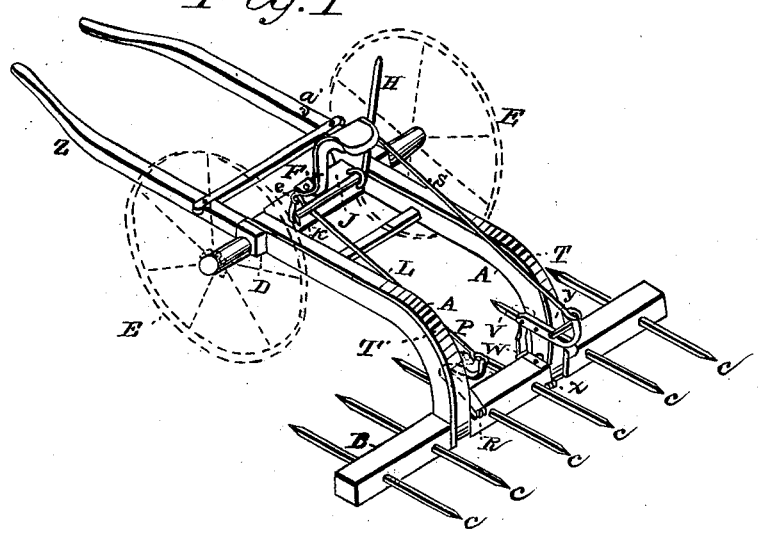
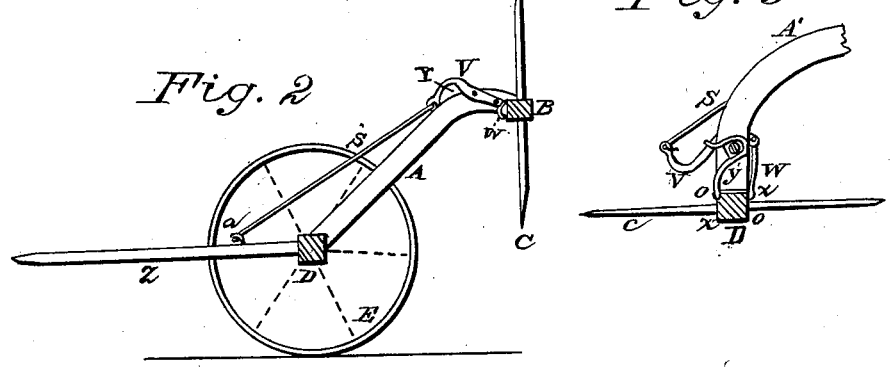
Witnesses
Inventor
F. M. Buckmaster
per W. V. B. N. Richards, atty

UNITED STATES PATENT OFFICE.

F. M. BUCKMASTER, OF GALESBURG, ILLINOIS.

HORSE-RAKE.

Specification forming part of Letters Patent No. 95,315, dated September 28, 1869.

*To all whom it may concern:*

Be it known that I, F. M. BUCKMASTER, of the city of Galesburg, county of Knox, and State of Illinois, have invented certain new and useful Improvements in Horse-Rakes; and I hereby declare the following to be a full, clear, and exact description of the construction and operation of the same, reference being had to the accompanying drawings, making a part of this specification, in which—

Figure 1 is a perspective view of my invention. Fig. 2 is a vertical sectional view of the same. Fig. 3 is a side elevation of the arm A', Fig. 1, showing the far side.

Similar letters of reference indicate corresponding parts in all of the figures.

The nature of this invention relates to improvements in horse-rakes; and the invention consists in the device for operating or revolving the rake, and the device for holding the same from revolving when desirable, the said device being at the same time so constructed as to admit of being used to suspend the rake from or above the ground when moving the same and when not in use.

To enable others to understand the construction and operation of my invention, I will proceed to describe it with reference to the drawings.

D represents the axle, supported on the wheels E, and carrying the arms A A', pivoted to the axle D in any of the usual manners.

B represents the rake-head, having journals by which it is supported in bearings on the end of the arm A, allowing it to revolve freely.

C C represent the rake-teeth.

F represents the driver's seat.

K represents a lever pivoted to the axle D at J J, and extended upward at one end, H, near the driver's seat, and at the other end at *e*.

V represents a lever pivoted to the side of the arm A', and carrying on its forward end the pawl W, which is pivoted to the said lever V and operates in a catch, X, on the rake-head B, there being two of these catches X on diagonal corners of the rake-head B.

S represents a rod connecting the hand-lever H with the rear end of the lever V.

Y represents a lever or pawl (shown fully at Fig. 3) pivoted to the side of the bar A' opposite the lever V, and having its lower end operate in a catch, O, of which there are two on diagonal corners of the rake-head B, the upper end of said lever Y being bent, so as to rest on the rear end of the lever V.

P represents a lever or pawl pivoted to the arm A, with its lower end operating in the catch R, of which there are two on diagonal corners of the rake-head, and its upper end connected by the rod L with the end *e* of the lever K.

The manner of operating my machine is as follows: The pawls P and Y serve to keep the rake-head from revolving, and there being one at each end of the rake-head will prevent teeth at one end of the head from catching and twisting the head off at the journals. Now, by drawing the lever H forward, the pawls P and Y will both be released, and the pawl W engage with one of the catches X and serve to throw the forward teeth C C to the ground and revolve the rake and discharge its load. The hand-lever H being released, the lever V will drop back, and the pawls Y and P engage with the notches O and R and hold all steady again.

When it is desired to convey the rake from point to point it may be suspended by releasing the pawl W and by lifting the rod S and carrying it forward and hooking or passing the eye on the end of the same over the hook *a* on the thills or tongue Z.

Having thus described my invention, what I claim as new, and desire to secure by Letters Patent, is—

1. The lever V, with pawl W and catch X, in combination with pawl Y and catch O, constructed and operating substantially as described.

2. The combination of lever V, pawl W and catch X, pawl Y and catch O, pawl P and catch R, constructed and operating substantially as described.

3. The combination and arrangement of lever H, rods S and L, pawls P and Y, lever V, with pawls W, arms A A', and revolving rake-head B, with catches R, X, and O, substantially as described.

Subscribed and signed at Galesburg, Illinois, this 7th day of May, 1869.

F. M. BUCKMASTER.

Witnesses:
 J. B. HARSH,
 PLATT R. RICHARDS.